(No Model.)
W. F. HOYT.
WHEEL BEARING.
No. 442,118. Patented Dec. 9, 1890.
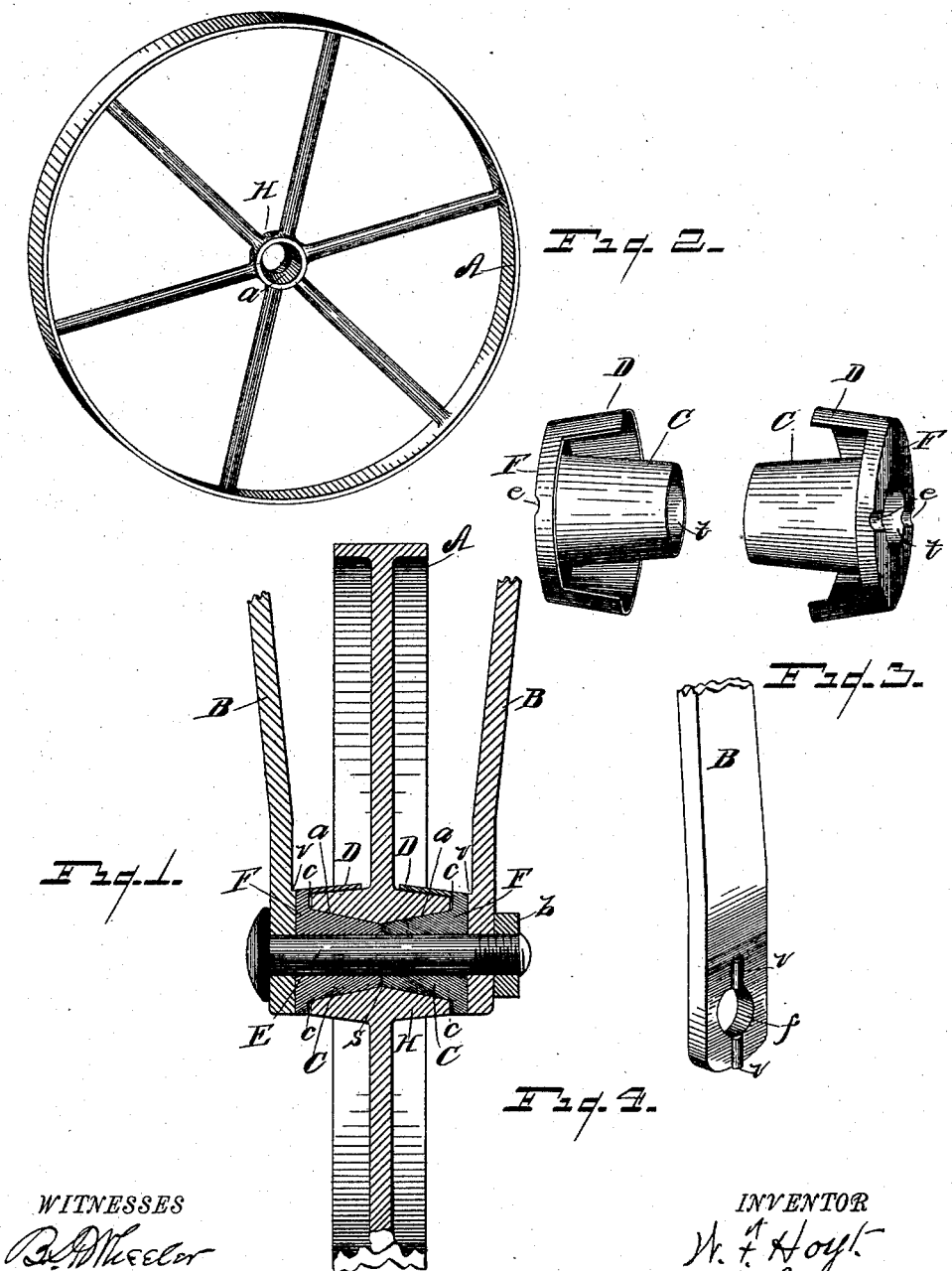
WITNESSES
INVENTOR
W. F. Hoyt.
By Roscoe B. Wheeler,
Attorney.

UNITED STATES PATENT OFFICE.

WILL. F. HOYT, OF DOWAGIAC, MICHIGAN.

WHEEL-BEARING.

SPECIFICATION forming part of Letters Patent No. 442,118, dated December 9, 1890.

Application filed October 16, 1890. Serial No. 368,346. (No model.)

*To all whom it may concern:*

Be it known that I, WILL. F. HOYT, a citizen of the United States, residing at Dowagiac, in the county of Cass and State of Michigan, have invented certain new and useful Improvements in Wheel-Bearings; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in combined bearing and sand-band especially adapted for the wheels of agricultural implements; and it consists in a certain construction and arrangement of parts, as hereinafter more fully set forth, the essential features of which being pointed out particularly in the claims.

The object of the invention is to avoid lathe-work on bearing parts to cheapen their construction and provide a chilled cone-bearing for said wheels, whereby the friction between the wearing parts is greatly reduced and the bearing rendered more serviceable; and to provide a sand-band that will exclude the sand and dirt from said wearing parts. This object is attained by the mechanism illustrated in the accompanying drawings, in which—

Figure 1 is a central vertical cross-section through a wheel and bearing provided with my improved feature, the bolt uniting the parts being in elevation. Fig. 2 is a perspective view of a wheel, showing the beveled faces of the interior of the hub. Fig. 3 is an enlarged perspective view of the conical bushings. Fig. 4 is an enlarged detail of the end of one of the arms or bars between which the wheel and axle-bearings are secured, as shown in Fig. 1.

Referring to the letters of reference, A indicates the wheel, which is provided with a chilled-iron hub H, the interior of which is beveled from the center of the hub outwardly to each end thereof, as shown at $a$, forming conical openings leading from the ends to the center of the hub.

C C indicate chilled cone-shaped bushings having a base F, provided with the flaring segmental flange D, formed integral therewith, said bushings also having an opening $t$ passing therethrough, as shown in Fig. 3.

B B indicate the arms or bars that support the wheel A and bearing parts, said arms being provided with an opening $f$ in their ends that receives the bolt E.

The conical bushings C are adapted to be inserted in the hub H of the wheel from each end thereof. The beveled faces $a$ of the interior of said hub coinciding with the angle of the bushing form a perfect bearing therefor, and the flanges D, extending over the ends of the hub, exclude the sand that may fall from the rim of the wheel from said bearing.

The wheel A is mounted on the arms B by means of the bolt E, which passes through the opening $f$ in the ends of said arms and through the bushings C, and receives the nut $b$ on the end thereof, whereby the parts are held firmly together, as clearly shown in Fig. 1.

To prevent the cones C from turning on the bolt E when the wheel is revolved, the outer face of the base F thereof is provided with the recesses or concaves $e$, that are adapted to receive the lugs or bosses $v$ on the inner face of the arms B when said parts are held in contact by the bolt E, as shown in Fig. 1, thereby locking said cones and allowing the hub H to revolve on the conical faces thereof. The arrangement of parts is such that when the conical bearings C are inserted in the hub H, with their smaller ends meeting at the center of the hub, as shown at $s$, the length of said cones is sufficient to cause the base F thereof to stand slightly away from the ends of the hub, so as to leave an open space $c$ between said hub and base, thus permitting the hub to turn freely on said cones, and the beveled faces $a$ of the interior of the hub coinciding with the angle of the cones C causes the wheel to revolve truly and to run to the center of its bearing. The cut-out portion of the flange D of the cones C is placed on the under side of the wheel-bearings, so that any dirt or sand that may have worked under the flange D on the upper side of the hub of the wheel will drop from the face of the hub as the wheel revolves.

Having thus fully set forth my invention, what I claim as new, and desire to secure by Letters Patent, is—

1. In combination with a wheel having a hole through its hub, which hole flares outwardly from the center toward the ends of the hub, the set of cone-shaped bearings adapted to fill the hole in the hub of the wheel and having the segmental flanges, said bearings having a hole through them, and a bolt passing therethrough, securing the bearings within the hub of the wheel, substantially as set forth.

2. The wheel having cone-shaped openings leading from the ends of the hub to the center thereof, combined with the two hollow conical bearings, each having the sand-band formed integral therewith, the bars having a hole in one end which registers with the hole through the conical bearings and having means for locking the bars to the ends of the conical bearings, and a bolt binding all of said parts, as set forth.

In testimony whereof I affix my signature in presence of two witnesses.

WILL. F. HOYT.

Witnesses:
C. A. PATTISON,
A. VANAXEM.